United States Patent [19]

Morita et al.

[11] Patent Number: 4,512,404
[45] Date of Patent: Apr. 23, 1985

[54] MICELLAR SLUG FOR OIL RECOVERY

[75] Inventors: Hiroshi Morita, Chiba; Yasuyuki Kawada, Funabashi; Junichi Yamada; Toshiyuki Ukigai, both of Chiba, all of Japan

[73] Assignee: Lion Corporation, Tokyo, Japan

[21] Appl. No.: 480,862

[22] Filed: Mar. 31, 1983

Related U.S. Application Data

[63] Continuation-in-part of Ser. No. 415,840, Sep. 8, 1982.

[30] Foreign Application Priority Data

Oct. 9, 1981 [JP] Japan ................................ 56-160296
Mar. 11, 1982 [JP] Japan ................................ 57-37186

[51] Int. Cl.$^3$ ............................................. E21B 43/22
[52] U.S. Cl. .............................. 166/274; 252/8.55 D; 252/312
[58] Field of Search ................... 252/8.55 D, 312, 555; 166/274, 275

[56] References Cited

U.S. PATENT DOCUMENTS

| 3,376,336 | 4/1968 | Stein et al. | 252/555 |
| 3,506,070 | 4/1970 | Jones | 166/274 X |
| 3,508,611 | 4/1970 | Davis et al. | 252/8.55 X |
| 3,536,136 | 10/1970 | Jones | 166/252 |
| 3,867,317 | 2/1975 | Woo et al. | 252/555 |
| 3,954,679 | 5/1976 | Wixon | 252/555 |
| 3,990,515 | 11/1976 | Wilchester et al. | 166/273 |

FOREIGN PATENT DOCUMENTS 1031686 5/1978 Canada .............................. 252/8.55

Primary Examiner—Herbert B. Guynn
Attorney, Agent, or Firm—Armstrong, Nikaido, Marmelstein & Kubovcik

[57] ABSTRACT

A micellar slug for use in the recovery of oil is described, the slug containing a hydrocarbon, an aqueous medium, a surfactant, and a cosurfactant. The surfactant contains, as an essential component, a divalent metal salt of an alpha-olefin sulfonic acid. This micellar slug has an excellent salinity tolerance and hard-water resistance. Furthermore, the micro-emulsion formed from the present micellar slug is maintained stable in a subterranean reservoir formed by alkaline earth metal carbonates and, therefore, the oil recovery efficiency can be improved.

4 Claims, No Drawings

MICELLAR SLUG FOR OIL RECOVERY

CROSS-REFERENCES TO RELATED APPLICATION

This application is a continuation-in-part of Ser. No. 415,840, filed Sept. 8, 1982.

BACKGROUND OF THE INVENTION

1. Field of the Invention

This invention relates to a micellar slug suitable for use in a micellar drive for recovering oil from subterranean reservoirs. More specifically, it relates to a micellar slug capable of forming micro-emulsions at a high salt concentration and of readily adjusting the viscosity thereof within a wide range. The micellar slug of this invention is especially suitable for use in a micellar drive for recovering oil from subterranean reservoirs mainly formed by alkaline rocks including alkaline earth metal carbonates.

2. Description of the Prior Art

It is well known in the art that the so-called "primary recovery" methods, including pumping methods, can recover only a portion of petroleum or crude oil (which is referred as "oil" herein) from subterranean reservoirs and leave substantial amounts of oil in the subterranean reservoirs.

In order to recover the remaining large amounts of oil from the subterranean reservoirs, the so-called "secondary recovery" methods have been proposed. For example, water or gas is injected into subterranean reservoirs from an injection well at a pressure sufficient to increase the flowability of the oil, steam is injected into subterranean reservoirs so as to effect the displacement of oil toward a production well, or oil in subterranean reservoirs is partially burned to heat the subterranean reservoirs so as to decrease the viscosity of the oil and increase the flowability of the oil. Thus, by means of these methods, oil is recovered from subterranean reservoirs. Furthermore, the so-called various "tertiary recovery" methods, including a combination of secondary recovery methods and improved secondary recovery methods, utilizing surfactants or water-soluble polymers have also been proposed. These methods are generally called "enhanced oil recovery" (EOR) methods.

Of these EOR methods, the recent "micellar drive" methods are to be noted. According to these methods, a micellar slug, that is, clear micro-emulsion derived from water and oil such as petroleum, petroleum distillates or fuel oil, is injected under pressure into subterranean reservoirs for the recovery of oil in the subterranean reservoirs. These EOR methods are disclosed in, for example, U.S. Pat. Nos. 3,506,070, 3,613,786, 3,740,343, 3,983,940, 3,990,515, 4,017,405, and 4,059,154. These prior arts disclose that various kinds of surfactants including anionic-, nonionic-, and cationic-type surfactants can be used alone or in any mixture thereof in the formation of micellar slugs. Examples of such surfactants are petroleum sulfonates, alkylaryl sulfonates, dialkyl sulfosuccinates, alkane sulfonates, polyoxyethylene alkylether sulfates, alpha-olefin sulfonates, polyoxyethylene alkylethers, polyoxyethylene alkylphenylethers, polyol fatty acid esters, alkyltrimethyl ammonium salts, and dialkyldimethyl ammonium salts.

These surfactants used in the formation of micellar slugs must be available at a low cost since a large amount of micellar slugs is used for the recovery of oil from subterranean reservoirs. The surfactants used in micellar slugs should have a good thermal stability, salinity tolerance, and hard-water resistance because, since numerous oil production wells or oilfields are present in the world, subterranean reservoirs have a variety of properties and also a variety of available water, for example, from soft water containing no substantial amount of inorganic salts to brine containing large amounts of inorganic salts and polyvalent metallic ions. Furthermore, as mentioned above, the micellar slugs desirably have a viscosity approximately equal to that of the oil remaining in the subterranean reservoirs. Accordingly, it is desirable that the viscosity of micellar slugs be capable of being readily adjusted depending on the properties of the oil production wells. Since oilfields subjected to EOR methods usually contain oil having a high viscosity, the use of micellar slugs having a high viscosity in EOR methods is desirable.

It is known in the art that petroleum sulfonate is an optimum surfactant usable as an injection fluid in a micellar drive, especially due to its availability and low cost, since a large amount of an injection fluid is used in a micellar drive. However, a problem exists in that petroleum sulfonate has an unsatisfactory salinity tolerance, hard-water resistance, and viscosity adjustability, and, therefore, it can be applied only in the case of special oilfields. For this reason, various attempts have been made to improve the properties of petroleum sulfonate by using petroleum sulfonate together with other surfactants or water-soluble polymer-thickening agents. However, micellar slugs or surfactants having the desired properties and a satisfactory cost have not been obtained. Furthermore, when rocks constituting oilfields are formed by alkaline earth metal carbonates, the surfactants usable in such oilfields are naturally limited.

SUMMARY OF THE INVENTION

The object of the present invention is to provide a micellar slug for the recovery of oil, the slug having an excellent salinity tolerance, hard-water resistance and viscosity adjustability.

Another object of the present invention is to provide a micellar slug for the recovery of oil, the slug being capable of effectively forming a micro-emulsion in the case of subterranean reservoirs formed by alkaline rocks composed mainly of alkaline earth metal salts.

A further object of the present invention is to provide an improved oil recovery process using a micellar slug.

Other objects and advantages of the present invention will be apparent from the following description.

In accordance with the present invention, there is provided a micellar slug for the recovery of oil, the slug consisting essentially of a hydrocarbon, an aqueous medium, a surfactant, and a cosurfactant, the surfactant containing, as an essential component, a divalent metal salt of an alpha-olefin sulfonic acid (an alpha-olefin sulfonate) having 10 to 26 carbon atoms.

DESCRIPTION OF THE PREFERRED EMBODIMENT

The micellar slugs according to the present invention have an improved hard-water resistance and a remarkably improved salinity tolerance and are capable of forming micro-emulsions even in the presence of a large amount of inorganic salts due to the use of a higher alpha-olefin sulfonate as an essential constituent of the surfactant. The presence of inorganic salts in the micellar slug results in a further decrease in the interfacial tensions. The micellar slugs according to the present invention are capable of forming micro-emulsions even in the presence of a large amount of inorganic salts as mentioned above and, therefore, the viscosity of the micro-emulsions can be readily controlled to a wide range by changing the concentrations of the inorganic salts in the micro-emulsions. Furthermore, since the micellar slugs according to the present invention contain the divalent metal salts of the alpha-olefin sulfonic acids, the adsorption amount of the alpha-olefin sulfonate onto rocks is small even in the case of subterranean reservoirs formed by alkaline earth metal carbonates. Therefore, the micro-emulsions formed from the present micellar slugs are maintained stable in such a case, and the oil recovery efficiency can be improved.

The desirable micellar slugs of the present invention used for the recovery of oil are transparent or translucent micro-emulsions containing about 2% to about 90% by weight of a hydrocarbon, about 4% to about 95% by weight of an aqueous medium, about 1% to about 30% by weight of a surfactant containing, as an essential constituent, alpha-olefin sulfonate having 10 to 26 carbon atoms, and about 0.1% to about 20% by weight of a cosurfactant.

The aqueous medium usable in the formation of the micellar slug of the present invention includes soft water, and water containing inorganic salts (i.e., brine). For example, rain water, river water, lake water, subterranean water, oil stratum water, and seawater can be freely used in the formation of the micellar slug of the present invention.

As mentioned above, since the alpha-olefin sulfonates having a good hard-water resistance are used as an essential constituent of the surfactant in the micellar slugs of the present invention, the resultant micellar slugs have such an excellent hard-water resistance that about 5,000 ppm of a Mg ion (i.e., about 2.6% by weight of MgSO$_4$) can be present in the micellar slugs. Furthermore, the micellar slugs of the present invention have a surprisingly high resistance to alkali metal salts and can contain water including about 10% by weight of alkali metal salts irregardless of the kinds of alkali metal salts. Especially when another adequate surfactant is used together with the alpha-olefin sulfonate or when a certain cosurfactant is selected, brine including up to about 15% by weight of inorganic slats can be used in the formation of the micellar slugs of the present invention. Furthermore, it has been unexpectedly found that an increase in the concentration of inorganic slats in the micellar slugs of the present invention results in a further decrease in the interfacial tensions. Thus, water (or brine) usable in the formation of the micellar slugs of the present invention can contain 0% to about 15% by weight, desirably about 0.5% to about 12% by weight and more desirably bout 1% to about 10% by weight, of inorganic salts. Typical examples of the inorganic salts contained in the water (or brine) are NaCl, KCl, Na$_2$SO$_4$, and K$_2$SO$_4$. For instance, seawater contains about 3.5% by weight of inorganic salts including about 1,600 ppm, in terms of a Mg ion, of divalent metal ions. This salt concentration is within the desirable salt concentration range of the present invention.

The higher alpha-olefin sulfonates having 10 to 26 carbon atoms usable as an essential surfactant constituent in the formation of the micellar slugs of the present invention can be prepared by sulfonating alpha-olefins having 10 to 26 carbon atoms in any conventional manner, followed by neutralization with appropriate bases and, optionally, hydrolyzing the resultant neutralized products. When the neutralization is carried out by using a monovalent metal compound as the base, the desired divalent metal salt of the alpha-olefin sulfonic acid can be prepared by a salt-exchange reaction using an appropriate divalent metal compound.

The alpha-olefins usable in the production of the alpha-olefin sulfonates may be either straight-chain or branched-chain alpha-olefins. The desirable alpha-olefins are straight-chain alpha-olefins, but the inclusion of a small amount of branched-olefins can be permitted. The alpha-olefin sulfonates derived from the straight-chain olefins are mixtures containing about 50% to about 80% by weight of alkenyl sulfonates and about 50% to about 20% by weight of hydroxyalkane sulfonates. The alpha-olefin sulfonates contain about 20% by weight or less of disulfonates.

The use of alpha-olefin sulfonates having a high lipophilic nature in the micellar slug of the present invention results in a large decrease in the interfacial tensions and, therefore, the kinds and the amounts of hydrocarbons and cosurfactants can be selected from wide ranges. As a result, the oilfields or subterranean reservoirs to which the micellar slugs of the present invention can be applied are not so limited. For this reason, the alpha-olefin sulfonates used in the present invention are desirably those having 12 to 24 carbon atoms.

The alpha-olefin sulfonates usable in the present invention can be alkaline earth metal salts. The desirable counter cation is Mg.

Examples of alpha-olefin sulfonates usable in the formation of the micellar slugs of the present invention are: alpha-olefin sulfonate having 12 carbon atoms; alpha-olefin sulfonate having 14 carbon atoms; alpha-olefin sulfonate having 16 carbon atoms; alpha-olefin sulfonate having 18 carbon atoms; alpha-olefin sulfonate having 20 carbon atoms; alpha-olefin sulfonate having 22 carbon atoms; alpha-olefin sulfonate having 24 carbon atoms; alpha-olefin sulfonates having 14 to 16 carbon atoms; alpha-olefin sulfonates having 16 to 18 carbon atoms; and alpha-olefin sulfonates having 20 to 24 carbon atoms. These sulfonates may be used alone or in any mixture thereof.

As mentioned above, the micellar slugs of the present invention contain about 1% to about 30% by weight of the surfactant. However, the micellar slugs desirably contain about 3% to about 25% by weight of the surfactant, taking into consideration both the low interfacial tensions and the reasonable cost. The amount of the higher alpha-olefin sulfonates should be at least 50% by weight, desirably 70% by weight or more, based on the total amount of the surfactants contained in the micellar slugs.

The hydrocarbons usable as an oil component in the present invention include, for example, petroleum, liquefied petroleum gas, crude gasoline (naphtha), kerosine, diesel oil, and fuel oil. The recovered petroleum is desirably used due to its low cost and availability as well as its composition, which is similar to that of the oil contained in subterranean reservoirs. As mentioned above, the micellar slugs of the present invention can contain about 2% to about 90% by weight of hydrocarbons. The desirable concentration of hydrocarbons is within the range of about 3% to about 40% by weight to form an oil-in-water (O/W) type emulsion, since the use of a large amount of hydrocarbons is not economical.

The cosurfactants used in the formation of the micellar slugs of the present invention are an essential constituent for forming micro-emulsions associated with the surfactants. The cosurfactants usable in the present invention are those having an alcoholic hydroxyl group. The desirable cosurfactants are alcohols having a small water solubility and having the general formula:

$$RO(CH_2CH_2O)_nH$$

wherein n is a number of from 0 to about 4 and R is an alkyl or alkenyl group having 4 to 8 carbon atoms when n is zero and an alkyl or alkenyl group having 6 to 15 carbon atoms, a phenyl group, or an alkylphenyl group having 7 to 16 carbon atoms when n is not zero. The aliphatic groups of R may be straight-chain or branched-chain groups.

Examples of such alcohols are butanols, pentanols, hexanols, 2-ethylhexanol or other octanols, polyoxyethylene hexylethers ($\overline{n}=1$), polyoxyethylene decylethers ($\overline{n}=2$), polyoxyethylene tridecylethers ($\overline{n}=4$), polyoxyethylene butylphenylethers ($\overline{n}=2$), polyoxyethylene nonylphenylethers ($\overline{n}=3$), and polyoxyethylene dodecylphenylethers ($\overline{n}=4$).

As mentioned above, the micellar slugs of the present invention can contain about 0.1% to about 20% by weight of the cosurfactants. However, the desirable concentration of the cosurfactants is within the range of about 1% to about 10% by weight from the viewpoints of the stability of the micro-emulsions and the decreasing capacity for interfacial tensions.

As mentioned above, the micellar slugs of the present invention contain alpha-olefin sulfonates as an essential or major constituent of the surfactants. However, other auxiliary surfactants can also be included, together with the alpha-olefin sulfonates, taking into consideration the desired interfacial tensions, the desired viscosity, the adsorbability of the surfactants to rocks constituting subterranean reservoirs, and the cost and availability of the surfactants.

Examples of such auxiliary surfactants are anionic surfactants and nonionic surfactants such as petroleum sulfonates, alkylbenzene sulfonates, polyoxyethylene alkylether sulfates, dialkyl sulfosuccinates, paraffin sulfonates, internal olefin sulfonates, soaps, higher alcohol ethoxylates, alkylphenol ethoxylates, polyol fatty acid esters, fatty acid alkylol amides, and polyoxyethylene fatty acid amides.

The micellar slugs of the present invention can form the desired good micro-emulsions even when brine containing a large amount of inorganic salts is used. The desired increase in the viscosity of the micellar slugs can be readily accomplished by adding to the micellar slugs an appropriate thickening agent selected from water-soluble polymers. Examples of thickening agents usable in the formation of the micellar slugs are heteropolysaccharides produced by microbes, naphthalenesulfonic acid-formaldehyde condensates, polyacrylamides, polyacrylates, hydroxyethylcelluloses, and carboxymethylcelluloses.

The micellar slugs of the present invention can be readily obtained by any known method of production. For example, the hydrocarbons, the surfactants, the aqueous medium, and the cosurfactants can be mixed in any mixing order by using conventional mixing devices, mixing temperatures, and mixing pressures.

The recovery of oil from subterranean reservoirs can be carried out by means of any conventional micellar drive method by using the micellar slugs of the present invention. For instance, the micellar slugs are injected under pressure into at least one injection well of the subterranean reservoirs and then at least one driving fluid such as flood water and/or aqueous solution of aforesaid thickening agents is injected into the injection well so as to transfer or drive the remaining oil toward an oil production well and to recover the oil from the production well. A suitable amount of the micellar slugs injected into the injection well is about 5% to about 25% by volume of the porosity of the subterranean reservoirs.

As mentioned hereinabove, according to the present invention, micellar slugs containing a divalent metal salt of an alpha-olefin sulfonic acid and having a good salinity tolerance and hard-water resistance are provided, and the viscosity of the micellar slugs can be readily controlled. Thus, (i) either soft water or hard water can be freely used as an aqueous medium of the micellar slugs, (ii) the micellar slugs injected into the subterranean reservoirs are subjected to no substantial adverse affects by inorganic salts present in the subterranean reservoirs, (iii) the micellar drive method can be readily applied in subterranean reservoirs containing oil having a low to high viscosity, and, (iv) oil can be recovered at an improved efficiency even from subterranean reservoirs formed by alkaline earth metal carbonate rocks.

EXAMPLE

The present invention now will be further illustrated by, but is by no means limited to, the following examples in which the component ratios or amounts of samples used are based on "% by weight" unless otherwise specified.

Example 1

Micro-emulsions were prepared by weighing 10.5% of magnesium $C_{16}$-$C_{18}$ alpha-olefin sulfonate ($C_{16}$-$C_{18}$ AOS-Mg) or petroleum sulfonate TRS-10 (manufactured by Witco Chemical Corp.) as a surfactant, 4.5% of amyl alcohol as a cosurfactant, 17% of fuel oil (ASTM No. 2 oil) as a hydrocarbon, and 68% of an aqueous solution of a given amount of sodium chloride dissolved in demineralized water, or an aqueous solution of a given amount of calcium chloride or magnesium chloride dissolved in the above-prepared aqueous sodium chloride solution as a brine in a beaker and, then, stirring the resultant mixture at 100 rpm for 30 minutes at a temperature of 71° C.

The micro-emulsion forming capabilities, the interfacial tension decreasing capabilities, and the oil recovery efficiencies of the micro-emulsions were evaluated as follows. The results are shown in Table 1.

The micro-emulsion forming capabilities were determined from the visual appearances of the micro-emulsions according to the following:

| o | A transparent or translucent and homogeneous micro-emulsion was formed |
| x | An opaque suspension, rather than a micro-emulsion was formed. |

The interfacial tensions were measured by a spinning drop type tensiometer at 71° C. in an appropriately diluted system.

The oil recovery tests were carried out by using Berea sandstone core having a size of 3.8 cm diameter and 28 cm length and having a permeability of about 500 mD and a porosity of about 20%. The core sufficiently saturated with brine was set in a core holder and, then, fuel oil was injected under pressure into the core at a feed rate of 6 cc/min until no brine was discharged. Then, brine was injected under pressure at the same feed rate in a water drive method until the content of the fuel oil in the effluent became less than 0.1%. Thus, the fuel oil was recovered. After the water drive method, the core holder and the micro-emulsions were placed in a constant temperature bath at a temperature of 71° C. for a micellar drive method. The micro-emulsions were first injected under pressure into the core in an amount of 10% by volume of the pore volume, a polymer solution (i.e., 1000 ppm of Xanthan gum solution in a brine solution) was then injected under pressure in an amount of 100% by volume of the pore volume, and, finally, a brine was injected under pressure in an amount of 100% by volume of the pore volume. Thus, the fuel oil was recovered. The injection rate under prssure was 2 feet/day. The oil recovery efficiency was determined by measuring the amount of water in the core after the test in a toluene azeotropic method to convert the recovery amount of the fuel oil.

TABLE 1

| Sample No. | | 1 | 2 | 3 | 4 | 5 | 6 | 7 |
|---|---|---|---|---|---|---|---|---|
| Surfactant | | | | $C_{16}$-$C_{18}$ | AOS—Mg | | | Petroleum sulfonate |
| Brine (%) | NaCl | 1 | 5 | 10 | 14 | 8 | 8 | 1 |
| | $CaCl_2$ | — | — | — | — | 0.8 | — | — |
| | $MgCl_2$ | — | — | — | — | — | 0.8 | — |
| Micro-emulsion forming capability | | o | o | o | o | o | o | o |
| Interfacial tension ($\times 10^{-3}$ dyne/cm) | | 9.8 | 9.2 | 8.9 | 8.6 | 8.8 | 8.9 | 10.2 |
| Oil recovery (%) | | 83 | 86 | 87 | 88 | 88 | 87 | 76 |

Example 2

Micro-emulsions were prepared by weighing 10.5% of $C_{14}$ AOS-Mg, $C_{16}$ AOS-Ca, or $C_{22}$ AOS-Mg as a surfactant, 4.5% of amyl alcohol as a cosurfactant, 17% of fuel oil (ASTM No. 2 oil) as a hydrocarbon, and 68% of a 8% aqueous solution of sodium chloride dissolved in demineralized water as brine and, then, stirring the resultant mixture at 100 rpm for 30 minutes at a temperature of 71° C.

The micro-emulsion forming capabilities, and the interfacial tensions, and the oil recovery efficiencies of the micro-emulsions were evaluated in the same manner as in Example 1. The results are shown in Table 2 below.

TABLE 2

| Sample No. | 8 | 9 | 10 |
|---|---|---|---|
| Surfactant | $C_{14}$AOS—Mg | $C_{16}$AOS—Ca | $C_{22}$AOS—Mg |
| Micro-emulsion forming capability | o | o | o |
| Interfacial tension ($\times 10^{-3}$ dyne/cm) | 9.7 | 8.5 | 7.7 |
| Oil recovery (%) | 84 | 89 | 90 |

Example 3

Viscosities of Micro-emulsions containing $C_{16}$-$C_{18}$ AOS-Mg as a surfactant were determined. The micro-emulsions were prepared according to the composition of the sample No. 2, except that the kinds of the cosurfactants were changed and hydroxyethyl cellulose was added thereto as a thickening agent or was not added thereto. The viscosities were determined by a Brookfield viscometer at 25° C. The uniform micro-emulsions were formed when the thickening agent was added.

The results are shown in Table 3.

TABLE 3

| Sample No. | 11 | 12 | 13 | 14 | 15 |
|---|---|---|---|---|---|
| Surfactant (%) $C_{16}$-$C_{18}$AOS—Mg | 10.5 | 10.5 | 10.5 | 10.5 | 10.5 |
| Cosurfactant (%) | | | | | |
| Amyl alcohol | 4.5 | 3 | 4.5 | 4.5 | 4.5 |
| Isopropyl alcohol | — | 1.5 | — | — | — |
| Hydroxyethyl cellulose (ppm based on emulsion) | — | — | 1000 | 2000 | 3000 |
| Fuel oil (%) | 17 | 17 | 17 | 17 | 17 |
| Brine (%) 5% NaCl solution | 68 | 68 | 68 | 68 | 68 |
| Viscosity at 25° C. (cps) | 30 | 25 | 68 | 92 | 156 |

Example 4

An oil recovery test was carried out by using the micro-emulsion of sample No. 2. Limestone core having a permeability of about 100 mD (derived from Akasaka, Gifu, Japan) or Berea sandstone core having a permeability of about 100 mD was used in the test.

Oil was recovered at an efficiency of 85% in the case of limestone and at an efficiency of 86% in the case of Berea sandstone.

I claim:
1. A micellar slug for use in the recovery of oil, said slug consisting essentially of about 2% to about 90% by weight of a hydrocarbon, about 4% to about 95% by weight of an aqueous medium, about 1% to about 30% by weight of a surfactant, and about 0.1% to about 20% by weight of a cosurfactant, said surfactant containing, as an essential component, a divalent metal salt of an alpha-olefin sulfonic acid having 10 to 26 carbon atoms.

2. A micellar slug as claimed in claim 1, wherein said surfactant is the alpha-olefin sulfonate having 12 to 24 carbon atoms.

3. A micellar slug as claimed in claim 1, wherein said cosurfactant has the general formula:

$$RO(CH_2CH_2O)_nH$$

wherein n is a number of from 0 to about 4 and R is an alkyl or alkenyl group having 4 to 8 carbon atoms when n is zero and an alkyl or alkenyl group having 6 to 15 carbon atoms, a phenyl group, or an alkylphenyl group having 7 to 16 carbon atoms, when n is not zero.

4. A process for producing oil from an oil-bearing subterranean reservoir penetrated by wells which comprises the steps of:

(1) injecting into said reservoir through an injection well the micellar slug consisting essentially of about 2% to about 90% by weight of a hydrocarbon, about 4% to about 95% by weight of an aqueous medium, about 1% to about 30% by weight of a surfactant, and about 0.1% to about 20% by weight of a cosurfactant, said surfactant containing, as an essential component, a divalent metal salt of an alpha-olefin sulfonic acid having 10 to 26 carbon atoms;

(2) injecting into said reservoir at least one driving fluid; and (3) recovering oil from said reservoir through a production well.

* * * * *